United States Patent [19]
Overdiek et al.

[11] Patent Number: 5,685,332
[45] Date of Patent: Nov. 11, 1997

[54] VALVE ASSEMBLY

[75] Inventors: Gerhard Overdiek, Friedrichsdorf; Yuejin Gong, Bad Homburg; Randolf Körtge; Hans-Jürgen Lauth, both of Usingen; Van Doan Nguyen, Frankfurt, all of Germany

[73] Assignee: Luk Fahrzeug-Hydraulik GmbH & Co. KG., Bad Homburg, Germany

[21] Appl. No.: 418,359

[22] Filed: Apr. 7, 1995

[30] Foreign Application Priority Data

| Apr. 8, 1994 | [DE] | Germany | 44 12 459.7 |
| Apr. 8, 1994 | [DE] | Germany | 44 12 460.0 |
| Apr. 8, 1994 | [DE] | Germany | 44 12 461.9 |
| Jul. 15, 1994 | [DE] | Germany | 44 26 652.9 |

[51] Int. Cl.$^6$ ............................................. G05D 16/08
[52] U.S. Cl. .............................. 137/503; 137/115.04
[58] Field of Search ............................ 137/503, 504, 137/117, 115.04

[56] References Cited

U.S. PATENT DOCUMENTS

| 3,138,174 | 6/1964 | Gilpin | 137/503 X |
| 3,724,494 | 4/1973 | Alber. | |
| 3,752,184 | 8/1973 | Griswold | 137/504 |
| 3,965,921 | 6/1976 | Thurston | 137/117 |
| 4,047,846 | 9/1977 | Komamura et al. . | |
| 4,252,141 | 2/1981 | Burgdorf et al. . | |
| 4,311,161 | 1/1982 | Narumi et al. | 137/117 |
| 4,396,033 | 8/1983 | Narumi et al. | 137/117 |
| 4,502,501 | 3/1985 | d'Agostino et al. . | |
| 4,768,540 | 9/1988 | Mochizuki et al. | 137/503 X |
| 4,783,043 | 11/1988 | Koerber . | |
| 5,038,822 | 8/1991 | Iwata | 137/117 X |
| 5,220,939 | 6/1993 | Hamasaki et al. | 137/117 |

*Primary Examiner*—Stephen M. Hepperle
*Attorney, Agent, or Firm*—Anderson Kill & Olick, P.C.

[57] ABSTRACT

A valve assembly for controlling fluid flow to an actuator, including first and second throttles for controlling partial flows therethrough, which together form a full flow to the actuator and which function indepedently from each other and are formed each by a variable metering orifice, and a flow control valve for controlling fluid flow through the first throttle and including a valve spool and a spring for biasing the valve spool to a position of a maximum predetermined fluid flow through the first throttle.

1 Claim, 13 Drawing Sheets

VALVE ASSEMBLY

BACKGROUND OF THE INVENTION

The present invention relates to a valve assembly for controlling fluid flow to an actuator and including a throttle for controlling flow rate of a fluid delivered to the actuator, and a flow control valve for controlling fluid flow through the throttle, with the control valve including a valve spool displaceable in the valve assembly housing against a spring biasing force.

Use of valve assemblies including flow control valves for controlling fluid flow from, e.g., power assist pumps, is well known. The valve assembly provides for uniform flow of hydraulic fluid from the power assist pump to an actuator. This uniform fluid flow should be available independently of the speed of the power assist pump and, thus, independently of the pump output. The use of so-called three-way compensated flow control valves, which are provided with constant restriction orifices or flow throttles, to insure a constant flow rate of the hydraulic fluid in an operating conduit leading to the actuato is known. Also known are three-way compensated flow control valves with adjustable throttles and which include a valve spool with an extension that projects into a bore which defines, together with the extension the restriction orifice. The extension has a conical portion which, upon displacement of the valve spool, provides for changing of the free cross-sectional area of the restriction orifice, thus controlling the fluid flow therethrough. The drawback of the known flow control valves consists in that, because of the path-dependent control, the lowering of the flow rate characteristic, i.e., of the flow rate dependent on pump speed, while being adequate at low system pressures, is insufficient at high system pressure. Accordingly, an object of the invention is a valve assembly which would provide simple means for effecting a flow rate control that would enable an adequate lowering of the fluid rate characteristics also at high system pressures.

SUMMARY OF THE INVENTION

This and other objects of the invention, which will become apparent hereinafter, are achieved by providing two throttles or metering orifices which operate independently of one another and both control the fluid flow to the actuator. Providing two parallel, operating independently of one another, throttles for controlling partial or component flows therethrough, which throttles are formed by variable metering orifices one of which provides for path-dependent flow rate control and the other one provides for dynamic pressure-dependent flow rate control, made it possible to keep the flow rate characteristics in a narrow tolerance range also at different high system pressures. Because of a completely independent operation of the partial flow throttles, they cannot adversely affect operation of each other. Thus a full flow throttle arrangement, formed of two partial flow throttles, provides a system, which is stable even at high volumetric flows delivered from the pump at high system pressures, and in which adverse influence of partial flow rate characteristics on each other is excluded. Thus, the present invention provides for combined, independent of each other, path-dependent control and dynamic pressure-dependent control of the delivery flow. By such a control, it is possible to provide flow rate characteristics for high and low system pressures at a high delivery volumetric flow, which are independent of each other, so that the valve assembly retains its control characteristics, which were proved to be adequate at low system pressures, and insures obtaining of control characteristics which provide for adequate lowering of the flow rate characteristics at high system pressures.

Providing adjustable metering orifices, arranged parallel to each other and forming partial flow throttles which form together a full flow throttle arrangement, with independent adjustment of the metering orifices, permits to control the delivery flow within a wide range by appropriately adjusting any one or both of the metering orifices. By an appropriate selection or adjustment of the metering orifices, there can be provided a flow rate characteristic which insures an instant and adequate lowering of the delivery flow for each expected system pressure.

According to a preferred embodiment of the inventive valve assembly, the second partial flow throttle, which is controlled in accordance with a dynamic pressure, by a pressure difference between a delivery pressure of the delivery apparatus and a pressure acting on the valve spool, which pressure difference results from an increase of the delivery flow. Thus, advantageously, decoupling of control signals of both partial flow throttles takes place, so that the operation of both partial flow throttles independently of each other is insured at each operational condition of the delivery apparatus. Thus, the dynamic pressure-dependent operating partial flow throttle will be controlled by a pressure difference between the delivery pressure and a pressure acting on the valve spool, while the path-dependent operating partial flow throttle will be controlled by a pressure difference between the pressure of fluid delivered to the actuator and the pressure acting on the valve spool. The two separate partial flow throttles control the fluid flow therethrough in accordance with two different pressure signals, which are not directly dependent on each other. Thus, advantageously, the pressure difference between the delivery pressure and the pressure acting on the valve spool is used for controlling the fluid flow to the actuator.

In a further advantageous embodiment of the valve assembly according to the present invention, the delivery apparatus is connected with the valve assembly with two parallel channels, wherein one channel leads to a pressure chamber the pressure of which acts on the valve spool and on a piston, which forms the second partial flow throttle, the throttle piston, and another channel leads to a pressure chamber or space that insures application of the delivery pressure to the piston. Providing of the two, separated from each other channels, insures decoupling of two pressure signals that control the adjustment of the two partial flow throttles.

Advantageously, the first partial flow throttle is formed by an axial extension of the valve spool which projects into an opening formed in an end wall, with the extension having a conical enlargement and/or contraction. By providing such an extension, it becomes possible to effect, with a dynamic pressure-dependent control, a precise adjustment of the full flow throttle arrangement by using a path-dependent control.

According to a further advantageous embodiment of the valve assembly according to the present invention, the end wall, defining the first metering orifice, is made displaceable independently of the displacement of the valve spool extension and is formed by piston which is displaceable against a spring biasing force. This enables a combined path-dependent and flow force-dependent control of the fluid flow through the first metering orifice, whereby a double-stroke adjustment of the first metering orifice is insured by the adjustment of the piston displacement. Advantageously a pressure rise of the delivery flow is used for adjusting the displacement of the piston.

It is further contemplated that the piston, forming the end wall, serves as the throttle piston that forms the second metering orifice. The second metering orifice is formed advantageously of bypass openings, which extend parallel to the first metering orifice and which are provided in a guide sleeve for the throttle piston. The openings can have different cross-sections. This permits to combine the path-dependent control with the flow force-dependent-control, because an increase in the system pressure acting on the throttle piston is accompanied by an increase in the flow force. This flow force causes an increase in the pressure difference acting on the valve spool and on the throttle piston, and causes the displacement of the throttle piston, resulting in the change of the cross-section of the first metering orifice. Thereby, an efficient flow control at high system pressures and high delivery volumetric flows becomes possible.

According to a still further embodiment of the valve assembly according to the invention, the throttle piston, which forms the metering orifices, forms a cushioning chamber or space that is connected, by at least one through-opening, with a pressure chamber connected with the pressure side of the delivery apparatus. Providing a cushioning chamber makes advantageously possible to effect a fine adjustment of the metering orifice during reciprocating movement of the metering orifice forming piston, the throttle piston. The cushioning chamber changes its volume in accordance with the displacement of the throttle piston, with the fluid flowing into or out from the cushioning chamber, dependent on the direction of the piston displacement. Thereby, an increased or decreased pressure acts on the piston, i.e., on a piston surface defining the cushioning chamber. The pressure in the cushioning chamber acts opposite to a vibration-causing movement of the piston and, thereby, provides a braking force acting on the piston, cushioning its abrupt displacements. This further prevents unsteady changes in flow rate characteristics of the fluid flow controlled by the piston.

Advantageously, the opening that connects the cushioning chamber with the pressure chamber of the valve assembly, extends at an arbitrary selected angle to the center line or axis of the valve assembly. By selecting an appropriate angle, it is possible to determine whether the increase in pressure of the fluid flow from the delivery apparatus is used for only flow force-dependent adjustment and cushioning of the throttle piston, for only dynamic pressure-dependent adjustment and cushioning of the piston, or for providing a combination of both flow force-dependent and dynamic press-dependent adjustment and cushioning of the throttle piston. The angle of the inclination of the opening can vary from 0 to 90°. At an angle of 0°, only the portion of the pressure increase caused by flow forces is used. At an angle of 90°, only the portion of the pressure increase caused by the dynamic pressure is used. The magnitude of the inclination angle between 0° and 90° determines the proportion of the pressure increase portions for effecting respective flow force-dependent and dynamic pressure-dependent adjustments of the throttle piston. This provides for a precise determination of the control characteristics of the throttle piston for different operational conditions, and determines whether the increase in the dynamic pressure or the increase in the flow force should be predominant for effecting the adjustment and cushioning of the throttle piston.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENTS

Figure 1:
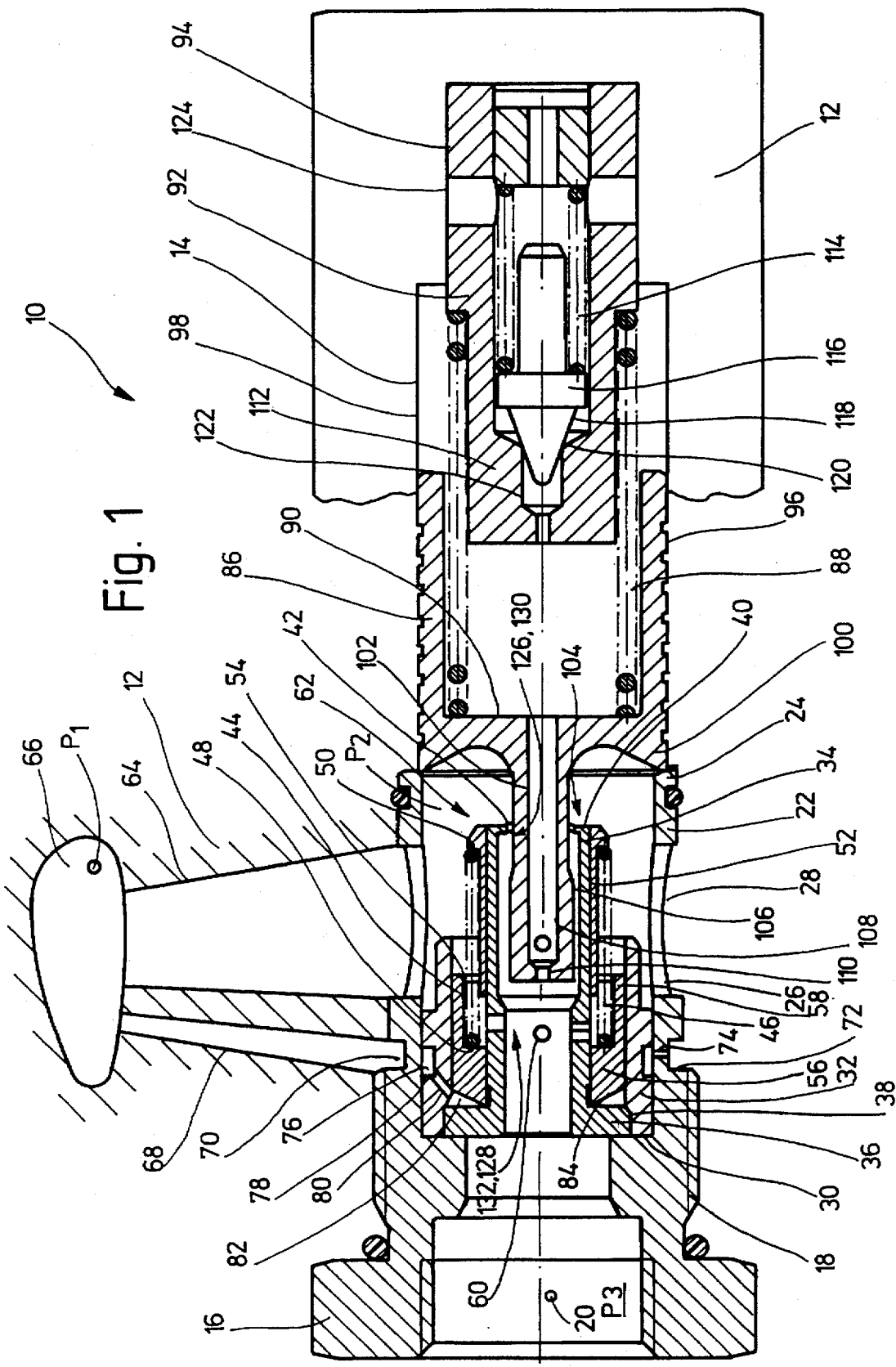
FIG. 1 is a longitudinal cross-sectional view of a valve assembly according to the present invention.

A valve assembly 10 according to the present invention, which is shown in FIG. 1, includes a housing 12 having an axially extending inner space 14. Only a portion of the housing 12 is shown in FIG. 1. At one end of the housing 12, the inner space 14 is closed with a plug 16. The plug 16 is secured with regard to the inner space 14 in a suitable manner, e.g., by a thread 18. The plug 16 has a through-opening 20 to which a hydraulic actuator (not shown), e.g., a power steering system of a motor vehicle, is connected. The plug 16 has an axial extension 22 which projects into the inner space 14. The extension 22 forms a stop 24. The extension 22 has a through-opening 26 which opens into an annular space 28 formed inside the inner space 14. The extension 22 forms an annular space 30 in which a gauge ring 32 is located. The gauge ring 32 is formed as a sleeve having an outer diameter corresponding to the inner diameter of the annular space 30. The gauge ring 32 is, e.g., pressed into the annular space 30. Inside the gauge ring 32, a sleeve 34 is located which abuts a flange 36 of the annular space 30 of the extension 22. The gauge ring 32 is provided with an undercut 38 that ends at the flange 36. The sleeve 34 extends in the through-opening 26 of the extension 22 and has a through-opening 42 formed in its end wall 40.

A ring piston 44 is displaceably arranged between the sleeve 34 and the gauge ring 32. The ring piston 44 is displaceable against a biasing force of an elastic element, e.g., a spring 46. The spring 46 is supported, on one hand, against a collar 48 of the ring piston 44 and, on the other hand, against a collar 50 of another sleeve 52 circumscribing the sleeve 34. The sleeve 52 can, e.g., be pressed onto the sleeve 34. The ring piston 44 has a stepped bore 54 which defines a collar 48. The stepped bore 54 defines a portion 46, which provides for the displacement of the ring piston 44 along the sleeve 34, and a portion 58 which is spaced from the sleeve 34, surrounding the same. The sleeve 34 has in the region of the piston 44 and, in particular in the region of the piston portion 58, a plurality of through openings 60 formed in the sleeve circumference. The openings 60 connect the through-opening 20 of the plug 16 with an inner space 62 formed in the extension 22. The opening 26 communicates the inner space 62 with the annular space 28.

A first channel 64 opens into the annular space 28. The channel 64 is connected with a pressure side 66 of a hydraulic delivery apparatus (not shown), e.g., a power assist pump. The pressure side 66 is shown in FIG. 1 schematically as an oval. A second channel 68 opens into an annular space 70 formed, e.g., by an annular groove 72 of the plug 16. At least one radial opening 74 communicates the annular groove 72 with a further annular space 76 which is formed by an annular groove 78 of the gauge ring 32. An opening 80 communicates the annular space 76 with a pressure chamber 82. The pressure chamber 82 is limited by the flange 36 of the sleeve 34 and an end face 84 of the ring piston 44. The end face 84 extends at an angle. The opening 80, the annular space 76, the opening 74, and the annular space 70 connect the pressure chamber 82 with the channel 68 and thereby with the pressure side 66 of the delivery apparatus.

According to one embodiment of the invention (not shown), the plug 16, the gauge ring 32, the sleeve 34, and the sleeve 52 can be formed as a one-piece part. Such one-piece part, because of its rotational symmetry can be rather easily manufactured. For guiding the ring piston 44, a corresponding guide sleeve is provided. In this case, the connection of the pressure chamber 82 with the channel 62 is effected by a single connection means, e.g., a bore.

Inside the inner space 14, a valve spool 86 is axially displaceable against a biasing force of an elastic element, e.g., a spring 88. The spring 88 is supported against a bottom 90 of the spool 86 and an insert 92. The insert 92 is arranged in a stepped bore 94 of the valve assembly housing 12. The spool 86 has a sealing surface 96 that sealingly engages a wall 98 defining the inner space 14 during the displacement of the spool 86. The spool 86 has an annular closure end 100 which is pressed against the end stop 24 of the plug 16 by the spring 88.

The spool 86 has an axial extension 102 which projects through the opening 42 of the end wall 40 of the sleeve 34. The diameter of the extension 102 is smaller than the diameter of the opening 42, so that an annular gap 104 is formed. The extension 102 has a conical enlargement 106. A bore 108 extends through the extension 102. A restriction orifice 110 of a small diameter connects the bore 108 with the opening 20. Inside the spool 86, the bore 108 opens into the inner space 14.

The insert 92 forms a pressure limiting valve 112, which includes a closing body 116 axially displaceable against a biasing force of an elastic element, e.g., a spring 114. The closing body 116 has a conical outer surface 118 which engages an edge 120 of a through-opening 122 of the insert 92. The through-opening 122 communicates with the inside of the spool 86. The insert 86 has at least one radial opening 124 communicating with a low pressure region, e.g., a reservoir or an inlet side of a hydraulic delivery apparatus.

The valve assembly shown in FIG. 1 function as follows:

Generally, the functioning of a valve assembly, such as shown in FIG. 1, is per se known. Such a valve assembly serves for delivering a predetermined fluid flow to an actuator connected with the opening 20 from a hydraulic delivery apparatus, with limiting the available flow rate (flow volume) and system pressure to predetermined values. The hydraulic fluid is available at the pressure side 66 of the hydraulic delivery apparatus. The hydraulic fluid is delivered to the valve assembly 10 through the channels 64 and 68. Thus, a delivery pressure $P_1$ is available at the pressure side 66 of the hydraulic delivery apparatus. The available fluid flows, through the ring space 28, the opening 26, into the inner space 62, and from the inner space 62 through the annular gap 104 and the opening 60 into the opening 20 of the plug 16 and, therefrom, to the hydraulic actuator. In this way, the annular gap 104 forms a first metering orifice 126, and the opening 60 forms a second metering orifice 128. A predetermined pressure $P_2$ is established in the inner space 62, which acts on the spool 86. The metering orifice 126, which is formed by the annular gap 104 cooperates with the conical enlargement 106 of the axial extension 102 of the spool 86 and forms a first partial flow throttle 130. The second metering orifice 128, defined by the opening 60, cooperates with the portion 56 of the ring piston 44 and forms therewith a second partial flow throttle 132. The partial flow throttles 130 and 132 transmit each a portion of a delivery flow from the hydraulic delivery apparatus and form together a full flow throttle arrangement of the valve assembly 10. A certain operational pressure $P_3$ is established in the opening 20 of the plug 16, and it is that pressure which is communicated to the hydraulic actuator.

The pressure $P_1$ at the pressure side 66 is communicated, through the available connections, described above, to the pressure chamber 82. During operation of the hydraulic delivery apparatus, a certain pressure relationship is established between the delivery pressure $P_1$, pressure $P_2$ and the operational pressure $P_3$, which influences the control of the valve assembly 10. The pressure $P_2$ in the inner space 62 presses the spool 86 against, the spring 88, whereas the operational pressure $P_3$ acts, through the bore 108, on the rear side of the spool 86 and, thus, against the pressure $P_2$. Dependent on the pressure difference between the pressures $P_2$ and $P_3$, the spool 86 will be displaced against the biasing force of the spring 88 and, thereby, will provide a so-called booster-connection, which will not be further discussed, to a low pressure space. Thereby, a delivery medium can flow from the inner space 62 through the booster-connection, e.g., to the reservoir of the hydraulic delivery apparatus. By the displacement of the spool 86, the axial extension 102 will be drawn into the annular gap 104, so that the conical enlargement 106 would reduce the annular gap 104. Thus, the flow through the annular gap 104, the first throttle, is determined by the displacement path of the spool 86. Thereby, a path-dependent control of a partial flow through the partial flow throttle 130 is effected.

The delivery pressure $P_1$ at the pressure side 66 acts, through the pressure chamber 82, on the end face 84 of the ring piston 44 the opposite face of which is subjected to the pressure $P_2$ established in the inner space 62. Dependent on the pressure relationship between $P_1$ and $P_2$, the piston 44 will be displaced against the biasing force of the spring 46, so that the portion 56 of the piston 44 will at least partially overlap the respective openings. Dependent on the displacement of the piston 44, the partial flow through the partial flow throttle 132 to the hydraulic actuator is controlled. This control is dependent only on the dynamic pressure and depends on the pressure difference between the delivery pressure $P_1$ and pressure $P_2$.

Thus, there is provided flow throttle means formed of two partial flow throttles 130 and 132, which insure, with an increase of the pressure difference between the pressure $P_1$ and $P_2$, a dynamic pressure-dependent reduction of a partial flow through the partial flow throttle 132, and, with an increase of the pressure difference between pressures $P_2$ and $P_3$, a path-dependent reduction of a partial flow through the partial flow throttle 130. The path-dependent partial flow 130 makes possible a fine adjustment of the full flow. Thus, the partial flow throttles 130 and 132 are controlled in accordance with separate pressure control signals.

Figure 2:
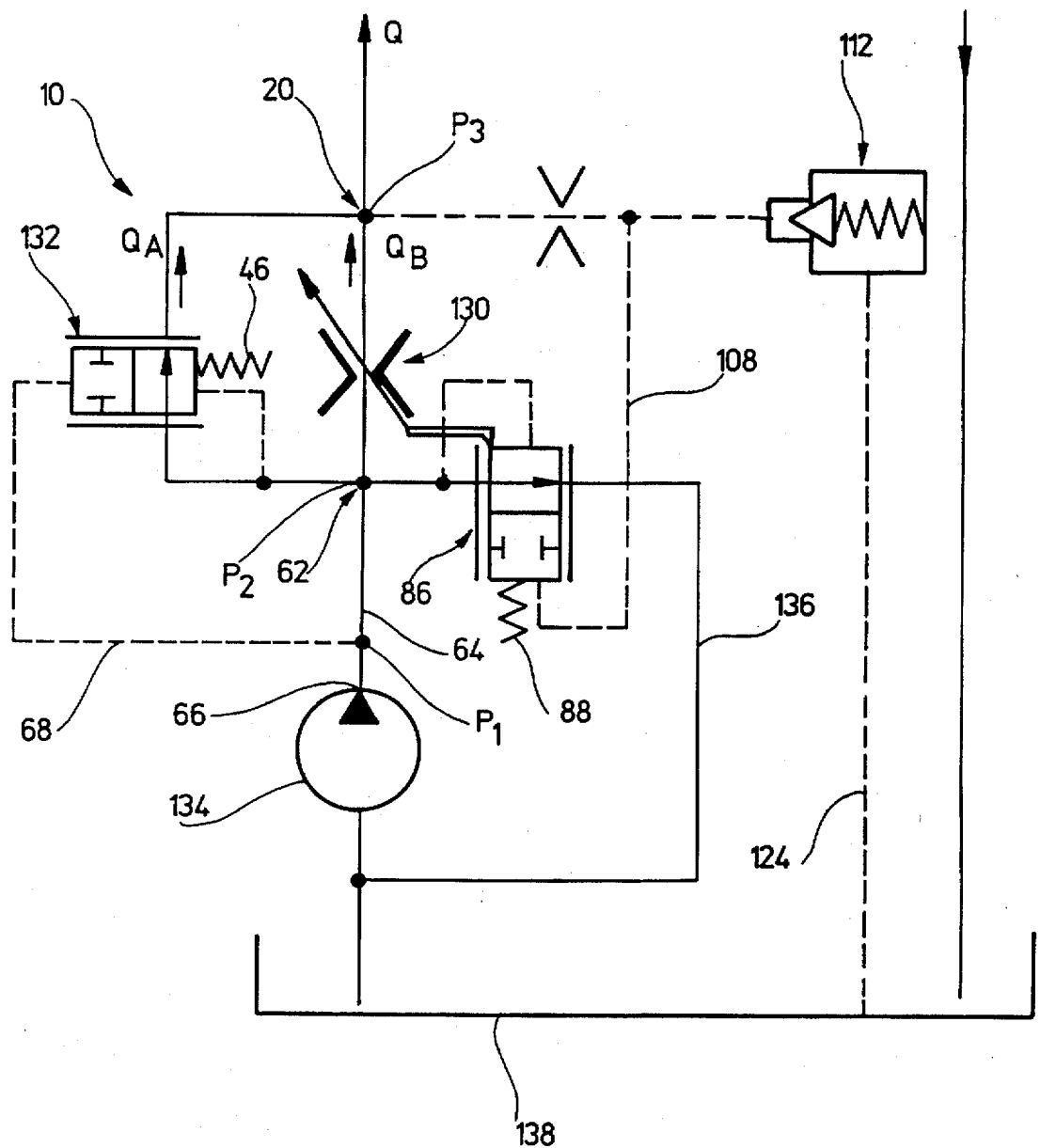
FIG. 2 is a circuit diagram of the valve assembly.

FIG. 2, as it has already been mentioned shows a circuit diagram of the valve assembly shown in FIG. 1. The circuit diagram will clarify the control functions of the partial flow throttles 130 and 132. In FIG. 2, elements corresponding to respective elements of FIG. 1, while being represented in different form, will be designated with the same reference numerals. A hydraulic delivery apparatus 134, upon its actuation, delivers a fluid flow which depends on the apparatus speed. If the hydraulic delivery apparatus is a power assist pump of a motor vehicle, the delivery apparatus will be driven by the internal combustion engine of the motor vehicle with a variable speed. The delivery hydraulic fluid flows from the pressure side 66 of the delivery pump 134 through the channels 64 and 68 to the valve assembly 10. The channel 68 leads to the second partial flow throttle 132 and is designated as a control channel. The channel 64 leads to both the first partial flow throttle 130 and to the second partial flow throttle 132. The union point of the two branches of the channel 64, which lead to first and second throttles 130 and 132, define the inner space 62 in which the pressure $P_2$ is established, whereas at the pressure side 66 of the pump 134, the pressure $P_1$ is available. The second partial flow throttle 132 is controlled in accordance with the pressure difference $P_1-P_2$, providing for a partial or component flow OA.

The path-dependent first partial flow throttle 130 provides for a partial or component flow QB, which is controlled in accordance with the pressure difference between the pressure $P_2$ and the operational pressure $P_3$. The partial flows QA and QB are combined in a common conduit leading to the actuator, e.g., in the opening 20, to provide a full flow Q.

The valve spool 86 is subjected, at opposite sides thereof, to the pressure $P_2$ and to the, communicating through the bore 108, pressure $P_3$. In accordance with the position of the spool 86, on one side, a path-dependent adjustment of the first partial flow throttle 130 is effected and, on the other side, an adjustment of the booster-connection 136 to the inlet region, e.g., the reservoir 138 of the hydraulic pump 134.

The operational pressure $P_3$ further acts on the pressure limiting valve 112 which opens when an adjustable minimal pressure is exceeded, and connects the opening 124 with the reservoir 138.

Figure 3:
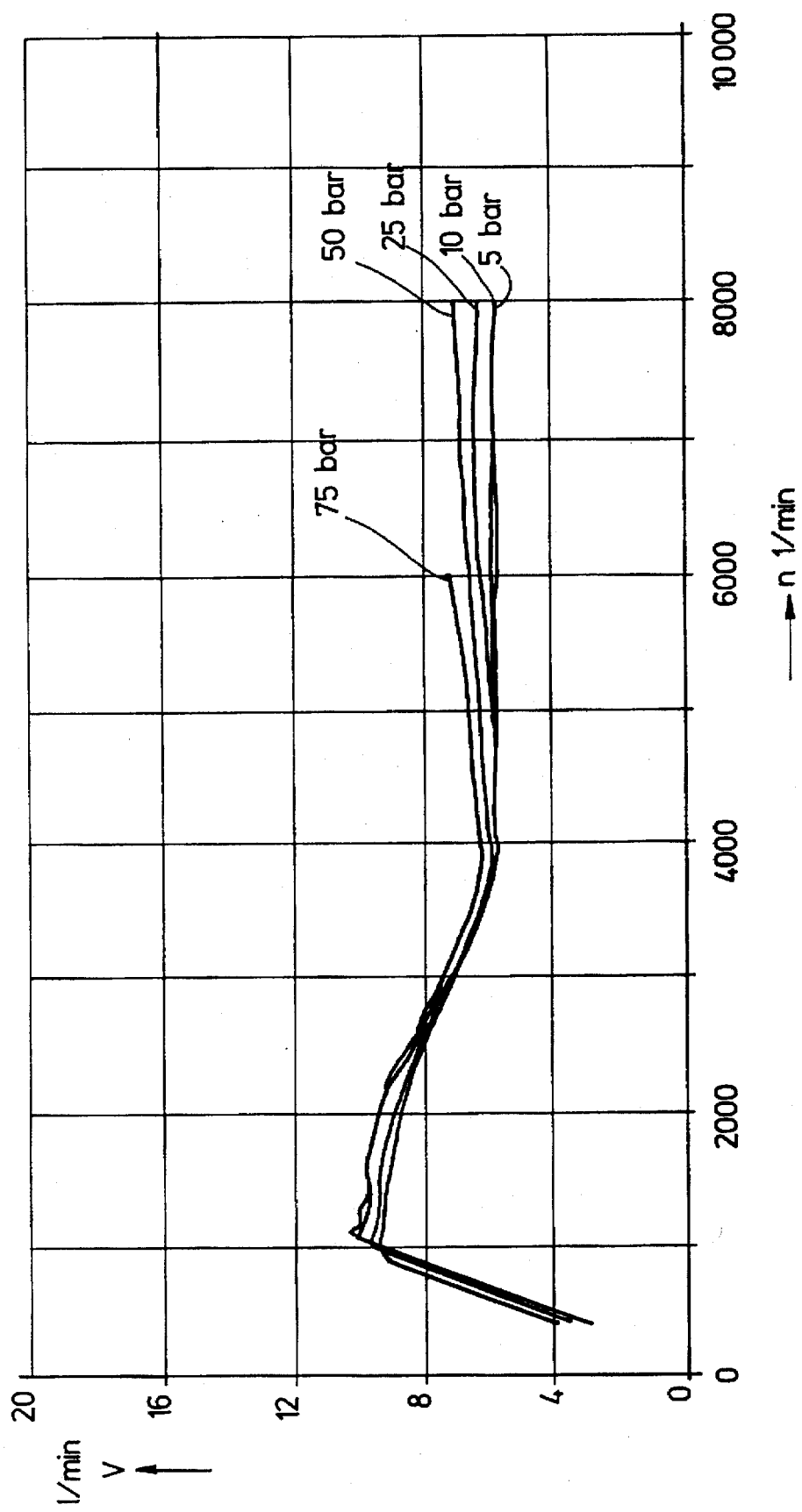
FIG. 3 is a diagram showing flow rate characteristics of the valve assembly according to the present invention.

FIG. 3 shows flow rate characteristics of the valve assembly 10. The characteristics show the dependence of the volume flow rate V liter/min. from the hydraulic delivery apparatus or pump 134 on the speed of the apparatus or pump N revolution/min. The characteristics are taken at pressures 75, 50, 25, 10 and 5 bar. The given pressure values correspond to the operational pressures of the connected hydraulic actuator. It is clear that, despite an extremely large differences in pressure, from 5 bar to 75 bar, the characteristics lie in a very narrow variation range. Thus, by providing two, operating independent from each other, partial flow throttles 130 and 132, a flow volume V can be held substantially constant at high speeds and at largely different high pressures. It means that the characteristic deviation range is rather small.

Figure 4:
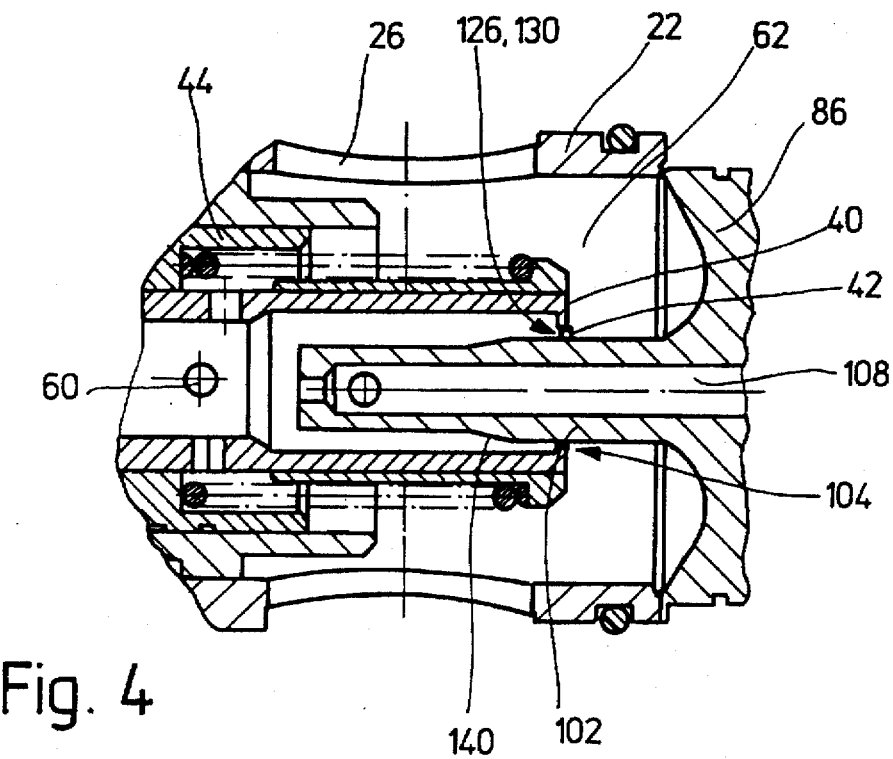
FIG. 4 is a cross-sectional partial view of the valve assembly showing a path-dependent partial flow throttle.
Figure 5:
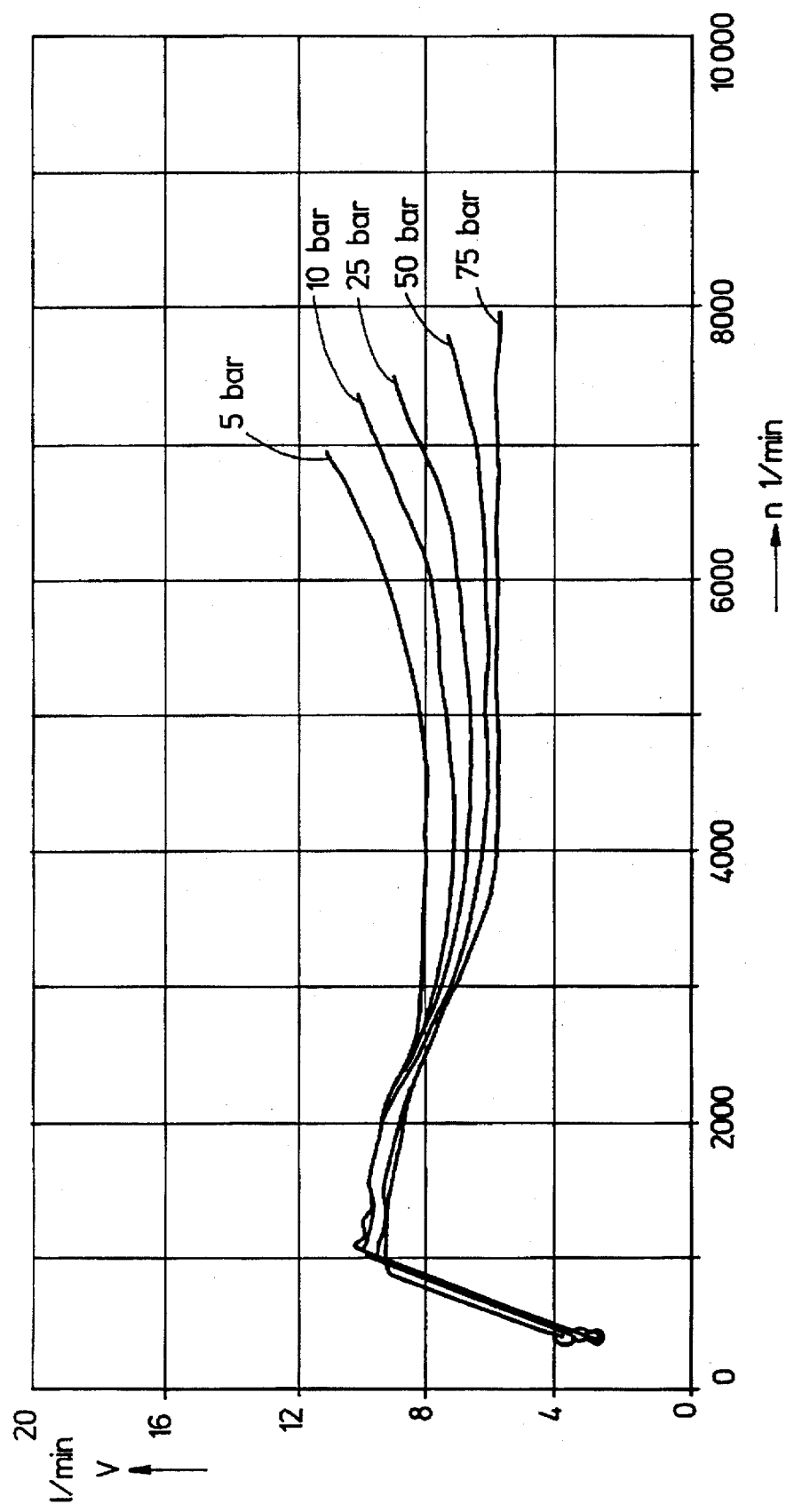
FIG. 5 is a diagram showing flow rate characteristics of the valve assembly with a throttle shown in FIG. 4.

FIG. 4 shows another embodiment of the path-dependent partial flow rate throttle 130 of the valve assembly 10. In FIG. 4, the same elements are designated with the same reference numerals and would not be discussed further. In FIG. 4, the axial extension 102 of the spool 86 has a conical contraction 140. Thus, during axial displacement of the spool 86, the annular gap 104 and, thereby, the first metering orifice 126, would not be reduced but would rather expand. Thereby the flow characteristics shown in FIG. 5 will occupy a somewhat wider range, as a result of such a control of the volumetric flow. By selecting the conicity of the contraction 140, a simple fine adjustment of the characteristics becomes possible.

Figure 6:
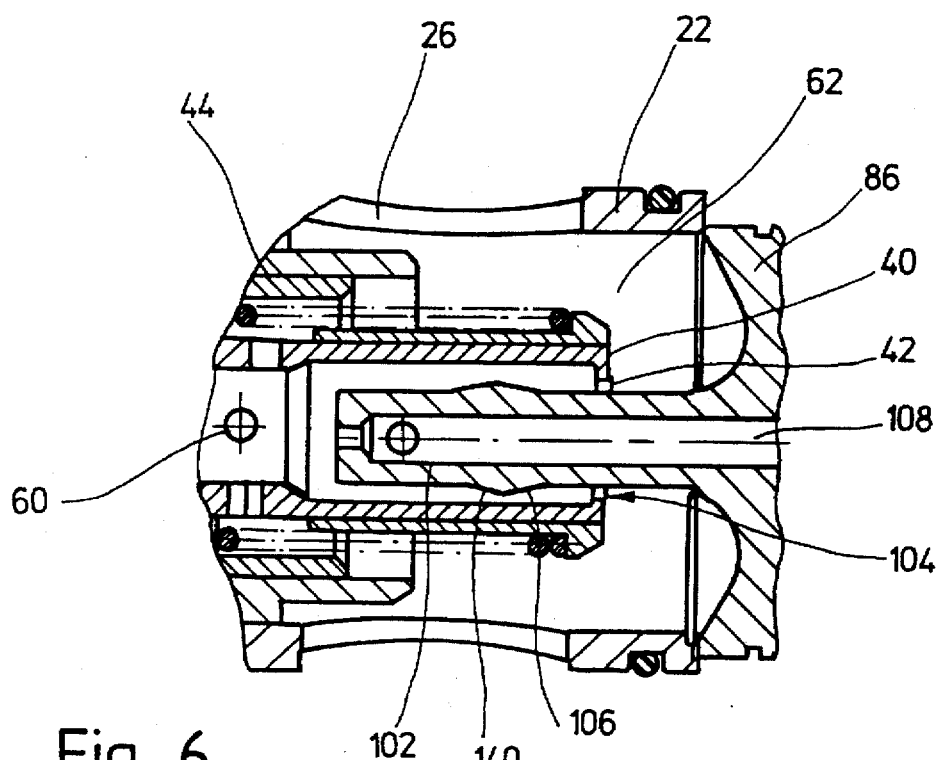
FIG. 6 is a partial cross-sectional view of the valve assembly showing another embodiment of a path-dependent partial flow throttle.
Figure 7:
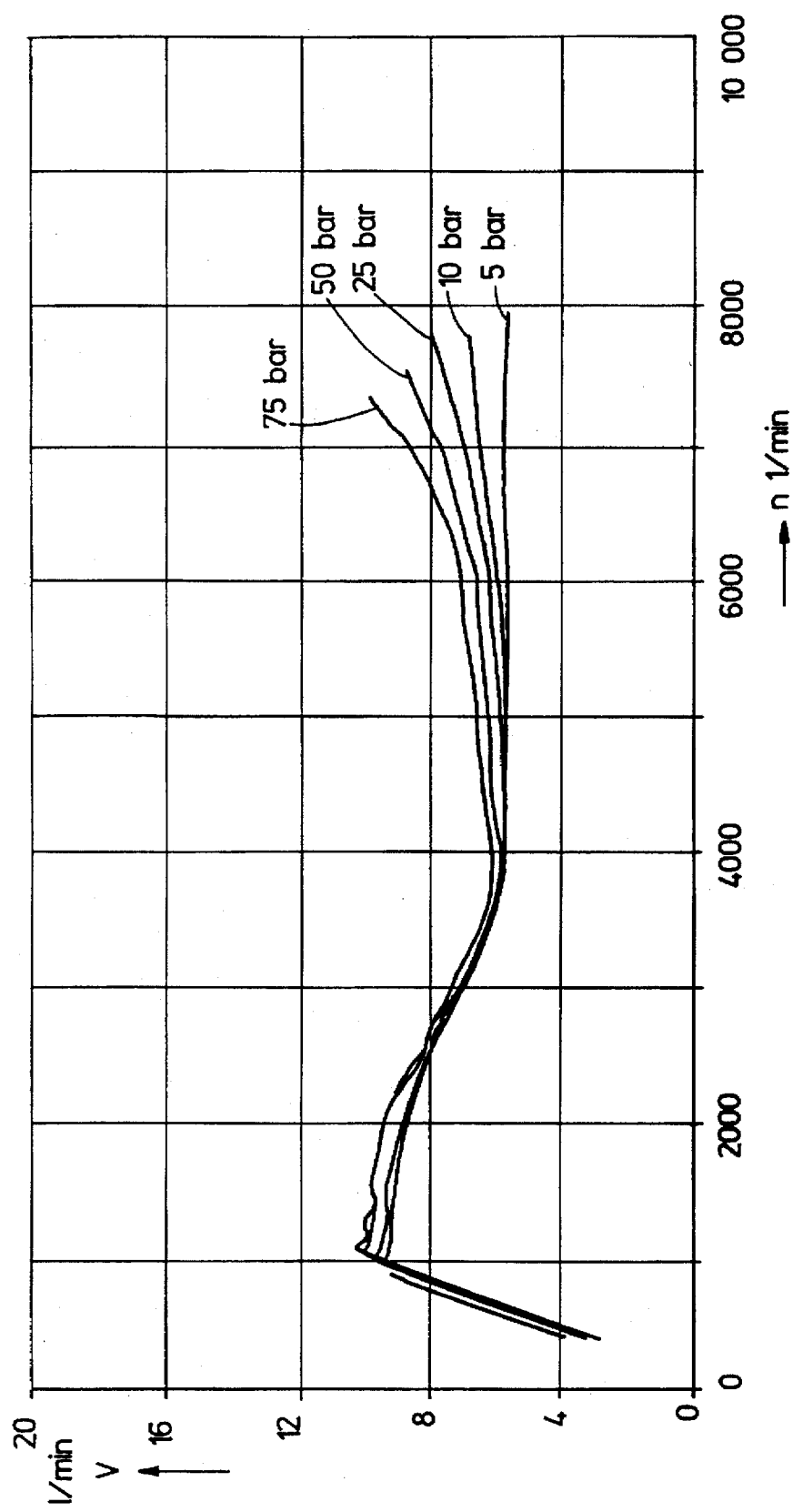
FIG. 7 is a diagram showing flow rate characteristics of the valve assembly with a throttle shown in FIG. 6.

According to FIG. 6, the extension 102 of the spool 86 is provided with both a conical enlargement 106 followed by a conical contraction 140. With the extension formed in such a manner, flow rate characteristics shown in FIG. 7 are obtained. The characteristics shown in FIG. 7 first form a narrow characteristic region which expands with the increase of the partial flow throttle 130 as it is being defined by the contraction 140.

Providing several alternate surface elements on the extension 102, conical enlargement, conical contraction and straight region, for obtaining different flow rate characteristics of the valve assembly 10 does not limit the stroke of the spool 86 besides the already available stroke.

Figure 8:
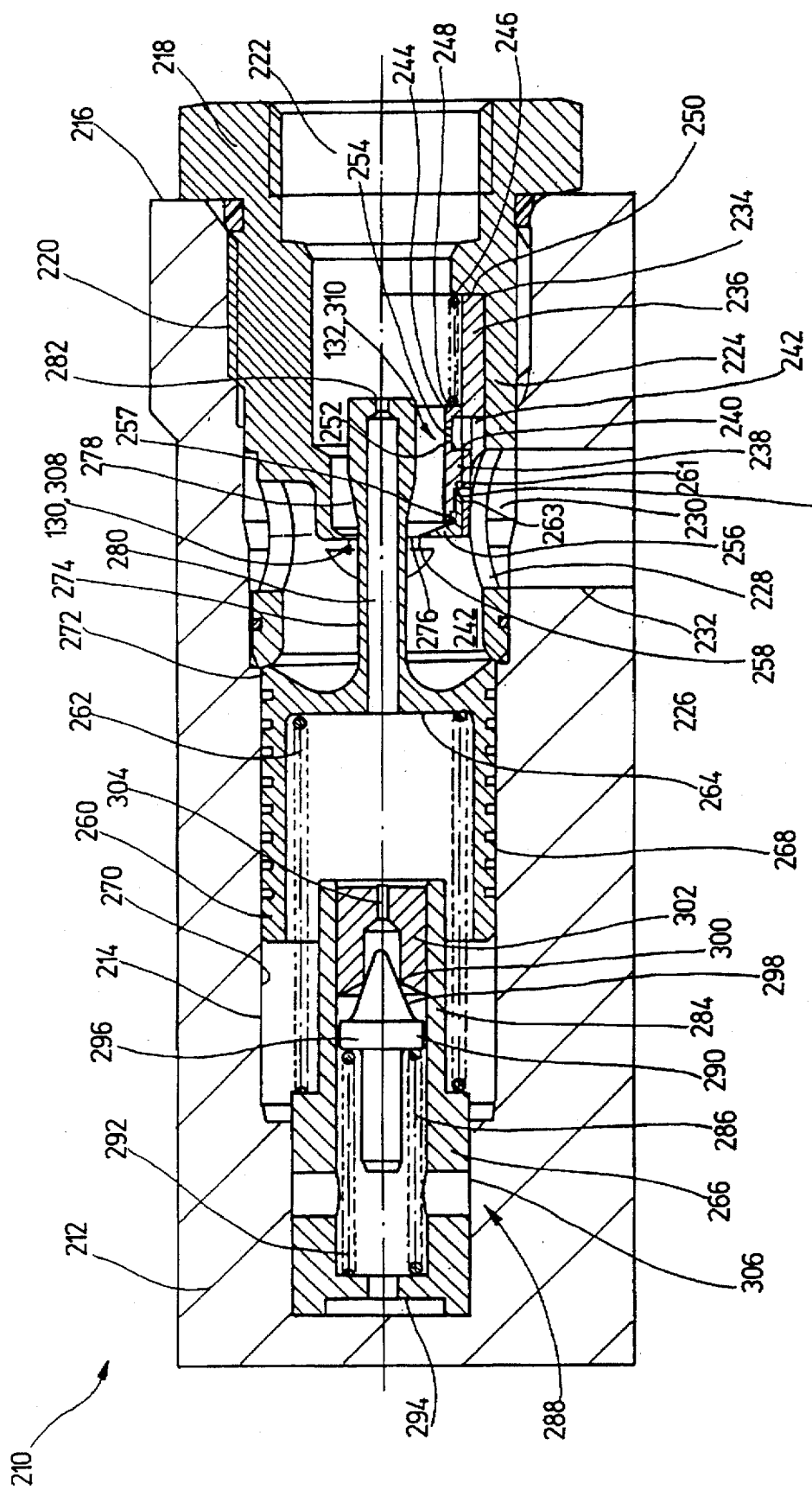
FIG. 8 is a longitudinal cross-sectional view of another embodiment of a valve assembly according to the present invention.

FIG. 8 shows another embodiment of a valve assembly according to the present invention designated with a reference numeral 210. The valve assembly 210 includes a housing 212 having an inner space 214. At the end side 216 of the housing 212, the inner space 214 is closed with a plug 218 that forms a valve seat. The plug 218 is secured with regard to the inner space 214 with appropriate means, e.g., the thread 220. The plug 218 has a through-opening 222 to which an actuator (not shown), e.g., a power steering system of a motor vehicle is connected. The plug 218 has an axial extension 224 which projects into the inner space 214 and forms an end stop 226. The extension 224 has a through-opening 228 that opens into an annular space 230. The annular space 230 is connected with a bore 232 which communicates with a pressure side of a delivery apparatus (not shown), e.g., a power assist pump formed as a vane pump. The extension 224 is provided, on its inner circumference, with an annular step space 234. A sleeve 236, having an axial extension 238 extending parallel to the extension 224, is arranged in the annular space 234. The sleeve 236 has at least one opening 240 which ends in a hollow space 242 inside the extension 224 of the plug 218. The number of openings 240 in the circumference of the sleeve 236 can be arbitrary selected. According to yet another embodiment (not shown), the opening 240 can be formed as an arcuate segment opening, i.e., as a slot-like opening. The hollow space 242 is connected with the annular space 230 by a through-opening 228. Inside the sleeve 236, a piston 244 is axially displaceable against a biasing force of a spring 246. The spring 246 is supported against an end face 248 of the piston 244 and against an end surface 250 of the annular space 234. The piston 244 has at least one through-opening 252 aligned with the opening 240 of the sleeve 236. The opening 240 and 252 define a second metering orifice 310. A reduced size opening 254 connects the opening 252 with the opening 222.

Figure 9:
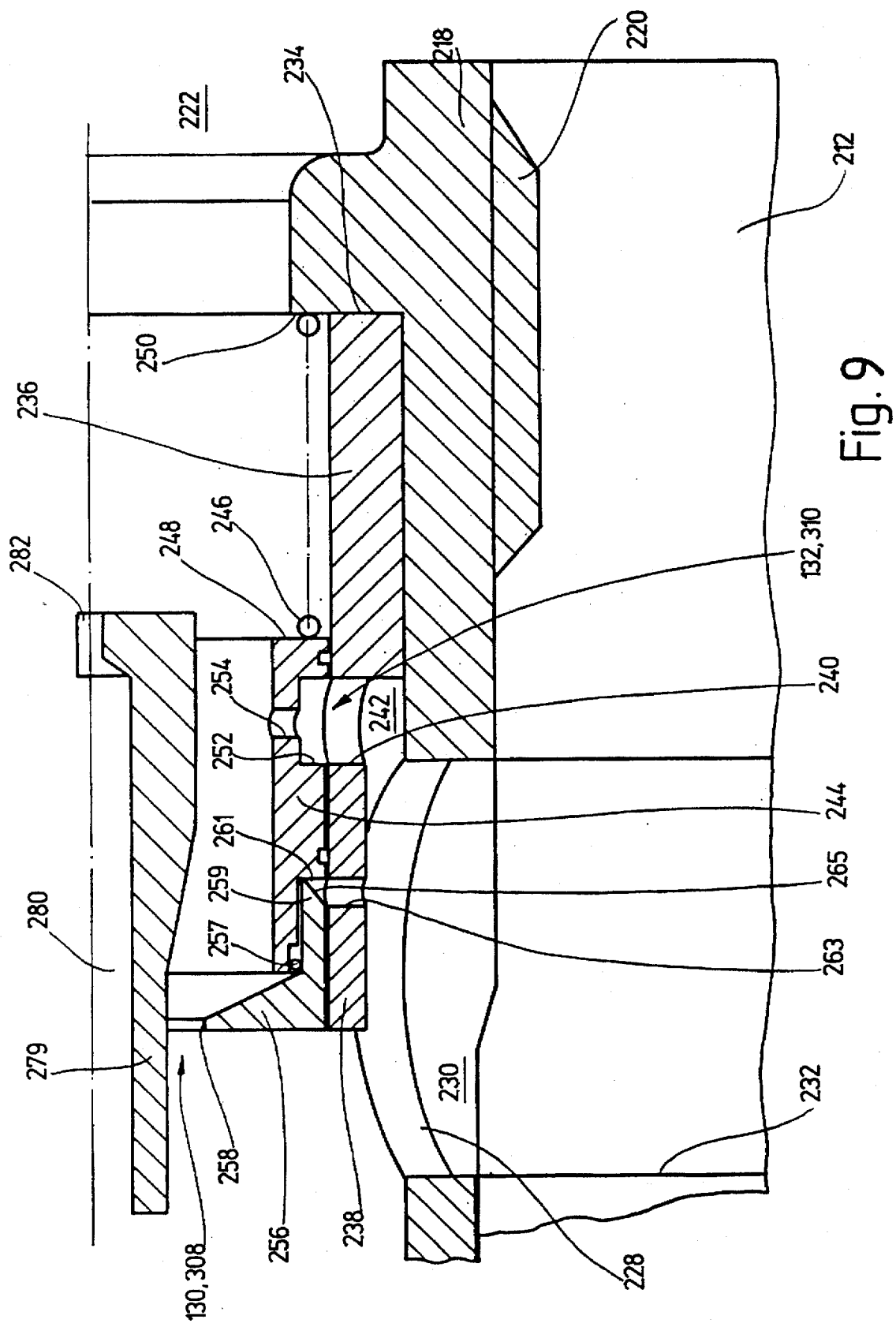
FIG. 9 shows a detail of the valve assembly shown in FIG. 8 at an increased scale.

As it is clearly shown in FIG. 9, which shows a respective portion of the valve assembly 210 at an increased scale, the sleeve 236 has an end wall 256 which forms a stop 259 for the piston 244. The piston 244 is provided, to this end, with a shoulder 261 that is biased against the stop 259 with the spring 246. In the region of the shoulder 261, the sleeve 236 has at least one opening 263 that communicates with the hollow space 242 and thereby with the pressure chamber of the valve assembly 210. The end stop 259 of the end wall 256 has a bevel 265. the bevel 265 insures that the shoulder 261 of the piston 244 remains clear and forms a chamber subjected to the delivery pressure. The end wall 256 has a through-opening 258 which communicates the hollow space 242 with the opening 222 and defines at least partially, a first metering orifice 308.

The region of the plug 218 in FIG. 8 is so divided by a center line that the portion above the center line shows a prior art structure, and the portion beneath the center line shows the structure according to the present invention.

Inside the inner space 214, a valve spool 260 is axially displaceable against a biasing force of a spring 262. The spring 262 is supported against a bottom 264 of the spool 260, on one hand, and an insert 266, on the other hand. The valve spool 260 has a sealing surface 268 that sealingly engages the wall 270 defining the inner space 214. The spool 260 has a stop surface 272 which is pressed by the spring 262 against the end stop 226 formed by the plug 218. The spool 260 further comprises an axial extension 274 which projects through the through-opening 258 of the end wall 256 and ends in the opening 222. The diameter of the extension 274 is smaller than the diameter of the through-opening 258, whereby an annular gap 276 is formed. At its end, the extension 274 has a conical enlargement 278. The opening 258 forms, together with the extension 274, a first metering orifice 308. The extension 274 has an axial bore 280 which is connected with the opening 22 by an orifice 282. The opposite end of the bore 280 ends in the inner space 214.

The insert 266 closes the inner space 214 at an end thereof remote from the plug 218 and can be pressed or screwed into the housing 212. The insert 266 has a sleeve 284 which defines an inner space 286. A pressure limiting valve 288 is arranged in the inner space 286. The pressure limiting valve 288 includes a slide body 290 displaceable against a biasing force of a spring 292. The spring 292 is supported, on one hand, against a bottom 294 of the insert 266 and a collar 296 of the slide body 290. The spring 292 biases the conical portion 298 of the slide body 290 against an edge 300 of a closure plug 302. The closure plug 302 is, e.g., pressed into the sleeve 284 and seals the inner space 286 with regard to the inners space 214. The closure plug 302 forms a valve seal for the pressure limiting valve 288. The closure plug 302 has an axial bore 304 that opens into the inner space 214. A radial opening 306 extends from the inner space 286. The opening 306 communicates with a bore (not shown) connected, e.g., with the reservoir or the inlet side of the hydraulic delivery apparatus.

The valve assembly 210 shown in FIG. 8 functions as follows.

The functioning of the valve assembly 210 in general is well known. The valve assembly serves for delivering a fluid flow to an actuator and for limiting the flow rate to a predetermined value. A fluid flow from a delivery apparatus (not shown) is delivered through the bore 232, the annular space 230, the through-opening 228 and the hollow space 242 and acts on the spool 260. A predetermined fluid flow is delivered through the annular gap 276 into the opening 222 and therefrom to the actuator which is connected with the opening 222. This flow is essentially determined by a free cross-section of the through-opening 258 (the partial flow throttle). A further fluid flow is delivered through the hollow space 242, the through-opening 240, the through-opening 252 (the partial flow throttle) into the opening 222 and therefrom, together with the first fluid flow, to the actuator. Thus, the annular gap 276 defines a first metering orifice 308, and the opening 252 defines the second metering orifice 310 of the valve assembly 210 (three-way flow controller), through which partial or component flows are delivered into the opening 222, where they are combined in a full flow delivered to the actuator.

Dependent on the volumetric flow, and a resulting differential pressure, through the metering orifices 308 and 310, the spool 260 will be displaced against the biasing force of the spring 262. With the axial displacement of the spool 260, simultaneously the extension 274 will be drawn into the opening 258. The conical enlargement 278 would cause reduction of the free cross-section of the opening 258, and the annular gap 276 will be proportionally reduced. Thereby, it is achieved that despite a high volumetric flow, a reduced delivery flow is delivered from the opening 222. Because the full delivery flow is formed of two partial flows, the reduction of the partial flow delivered through the metering orifice 308, results in a total reduction of the full flow. The adjustment of the metering orifice 308 functions in particular at a low system pressure.

When a volumetric flow delivered from the hydraulic delivery apparatus, i.e., power assist pump driven by the motor vehicle engine, increases due to an increased speed of the engine, there results an accompanying increase in the volumetric flow delivered to the actuator due to an increased flow through the bore 232. The increased flow causes an increase in fluid pressure in the hollow space 242. The fluid pressure in the hollow space 242 acts, on one hand, on the spool 260 and, on the other hand, on the shoulder 261 of the piston 244. When the pressure acting on the shoulder 261 exceeds a predetermined value defined by the spring 246, the piston 244 will be displaced against the biasing force of the spring 246. This will result in an axial displacement of the opening 262 of the piston 244 relative to the opening 240 in the sleeve 236, with a resulting reduction of the free cross-section of the metering orifice 310 defined by the openings 252 and 240. This reduction of the metering orifice will result in a reduced flow therethrough, despite the increased delivery flow from the delivery apparatus, so that less fluid is delivered to the opening 222 and thereby to the actuator.

By combining two, functioning independent from each other, metering orifices 308 and 310, it is achieved that it is possible to approximately control the delivery volumetric flow in the opening 222 despite different high system pressures and a high initial delivery flow. There are provided in this way flow rate characteristics which insure a reduction of the volumetric flow to a predetermined amount even at high pressures. Due to the appropriate shaping of the spool 260 and the piston 244, in particular their pressure— subjected surfaces, and an appropriate setting of the springs 260 and 246, the flow rate characteristics can be adjusted independently from one another as for high so for low system pressures. Path-dependent adjustment of the first metering orifice 308 provides for path-dependent control thereof. The second metering orifice 310 provides for a flow force-dependent control of the flow rate characteristics, in particular for high system pressures at high volumetric flows. The flow force-dependent pressure acts on the piston 244, which pressure is defined by a pressure difference between the pressures in the hollow space 242 and the opening 222. This pressure difference results in displacement of the piston 244 against the biasing force of the spring 246, with the accompanying adjustment of the cross-section of the second metering orifice 310.

The pressure established in the opening 222 is transmitted, through the core 280 of the extension 274 of the spool 260, to the inner space 214 and, thus, to the pressure limiting valve 288. Because of the restriction orifice 282, the pressure acting on the pressure limiting valve 288 will be smaller than in the hollow space 242. When a predetermined maximum pressure in the inner space 214 is exceeded, the pressure applied to the slide body 290 through the opening 304 will displace the slide body 290 against the biasing force of the spring 292, and the fluid will flow through the inner space 286 and the bore 306, e.g., to the inlet region or the reservoir of the hydraulic delivery apparatus. The pilot stage control with the pressure limiting valve 288 will result in the main stage control with the spool 260, which would be displaced to provide for flow of excess fluid, e.g., to the inlet region of the delivery apparatus. This limits the pressure to the maximum allowable value, so that no excess fluid is delivered to the actuator.

Figure 10:
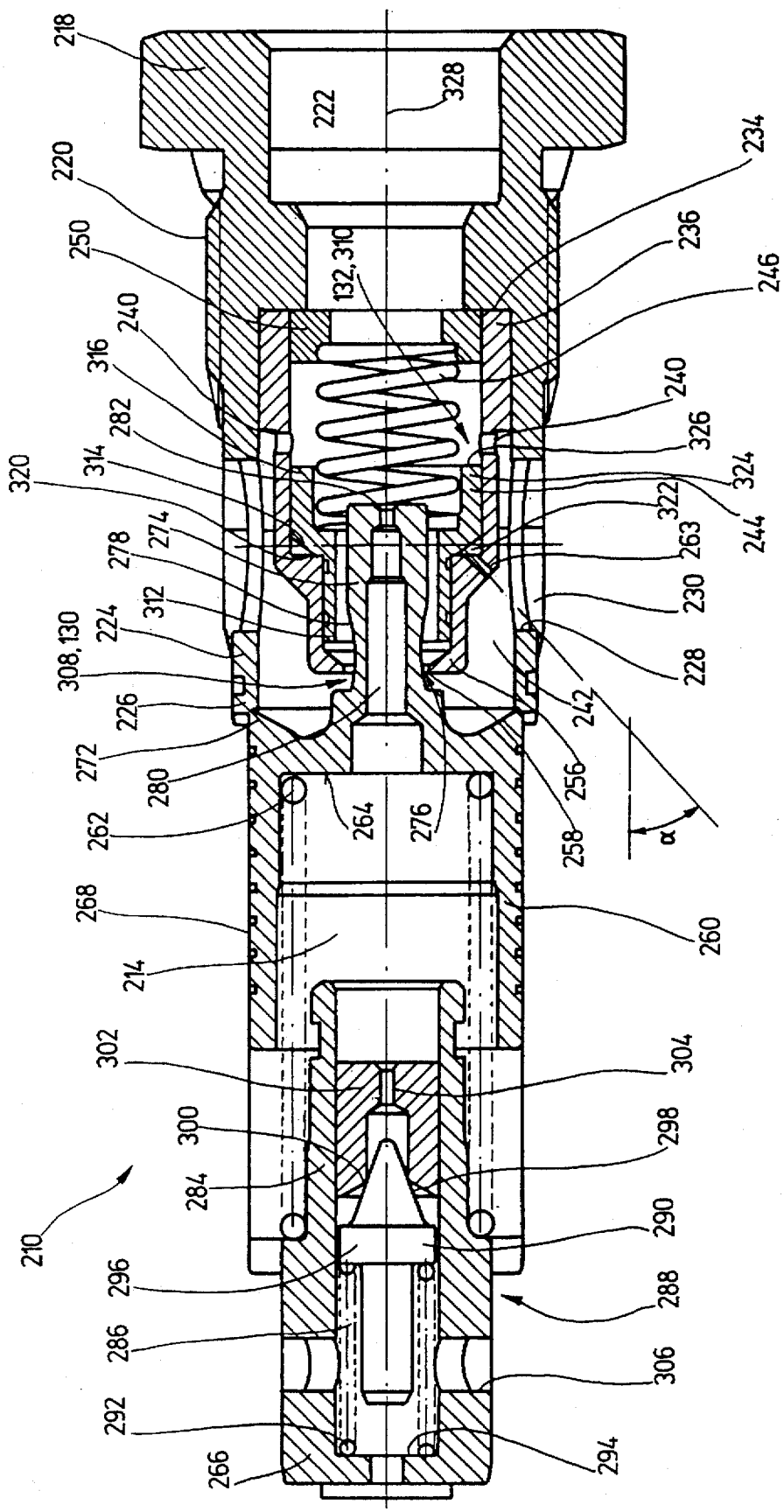
FIG. 10 is a longitudinal cross-sectional view of yet another embodiment of a valve assembly according to the present invention.

FIG. 10 shows a cross-sectional view of a modified embodiment of the valve assembly 210 shown in FIG. 8. In FIG. 10, the element similar to those of FIG. 8 will be designated with the same reference numerals and will not be further discussed.

For the sake of clarity, the housing 212 is not shown in FIG. 10.

In the embodiment shown in FIG. 10, the sleeve 236 defines the end wall 256, i.e., the sleeve 236 and the end wall 256 are formed by a one-piece member. Inside the sleeve 236, the piston 244 is displaced against the biasing force of the spring 246. The piston 244 has a reduced diameter portion 312 which is separated from a large diameter portion 316 by a shoulder 314. The shoulder 314 defines a stop surface that engages a stop surface 320 of the sleeve 236. The shoulder 314 is formed by a conical surface which defines a hollow space 322 that communicates, through the opening 263, with the hollow space 242. The opening 263 extends at an arbitrary selected angle to a center line 328 of the valve assembly 210 and forms a cushioning nozzle. The large diameter portion 316 of the piston 244 forms an annular extension 324 that defines an end face 248 of the piston 244. The annular extension 324 may have any arbitrary selected length, which is so selected that the end 326 of the annular extension 324 is axially spaced from the opening 240 in the sleeve 236. As discussed, the sleeve 236 may have a plurality of openings 240 formed in its circumference and axially spaced from each other.

The valve assembly shown in FIG. 10 functions in the same way as that shown in FIG. 8, so that only differences in their functioning will be discussed. With an increase of fluid pressure in the hollow space 242, the spool 260 will be displaced against the biasing force of the spring 262, and a free cross-sectional area of the annular gap 276 will be reduced. This, as discussed, permits to control the flow of fluid into the opening 222. The volume of fluid in the opening 222 will simultaneously be adjusted by adjusting fluid flow through the opening(s) 240. At high fluid pressure and a high volumetric flow, the partial flows are likewise increased. To prevent the increase of the partial flows first, the piston 244 is displaced against the biasing force of the spring 246 due to the difference between pressures in the hollow space 242 and the opening 222.

The above-discussed control of the fluid flow into the opening 222 and, thus, of the fluid flow to the actuator connected therewith, may cause vibrations of the piston 244 and, thereby, an unsteady change of the flow rate characteristics. The hollow space 322 forms a cushioning space for the piston 244, so that the vibrations, that is rapid increases and decreases of the size of the metering orifice 308 is prevented. The opening 263 connects the hollow space 322 with the annular space 230 so that the latter is filled with fluid. If the volumetric flow, because of an increased speed of the delivery apparatus, increases, the flow force-dependent pressure acting on the piston 244 likewise increases. This increases results from an increased pressure difference between the pressure in the opening 222 and the hollow space 242 or the hollow space 230. This increase provides for the adjustment of the metering orifice 308, by the displacement of the piston 244, and is transmitted to the hollow space 322. The cushioning characteristics of the hollow space 322 depends on the diameter of the opening (cushioning nozzle) 263. By selecting the angle X, at which the opening 263 extends to the center line 328, the dynamic pressure or the flow force in the hollow space 322 can be influenced. The smaller is the angle 2, the larger should be the flow force-dependent pressure for adjusting the piston 244. By approximately shaping the hollow space 322 and by selecting the position of the opening 263, the hollow space 322 can be used as a control space for controlling the trottling position of the piston 244. After mounting of the valve assembly 210, increase of either of the dynamic pressure-dependent flow component or the flow force-dependent flow component causes the adjustment of the piston 244.

As a result of the axial displacement of the piston 244, at least one or all of the openings 240 will be overlapped by the portion 316 of the piston 244 after overcoming the set dead shoke determined by an axial distance of the end 326 from the adjacent opening 240, dependent on the applied pressure. Therewith, the control of a delivery flow through the metering orifice 310 is effected. Thus, the full flow is controlled by the combination of the path-dependent control of the component flow through the first metering orifice 308 and the flow force-dependent control of the component flow through the second metering orifice 310. Again, as discussed above, it is possible to provide a desired flow rate characteristic at high pump flows as at low so at high system pressures acting on the hydraulic actuator.

Figure 11:
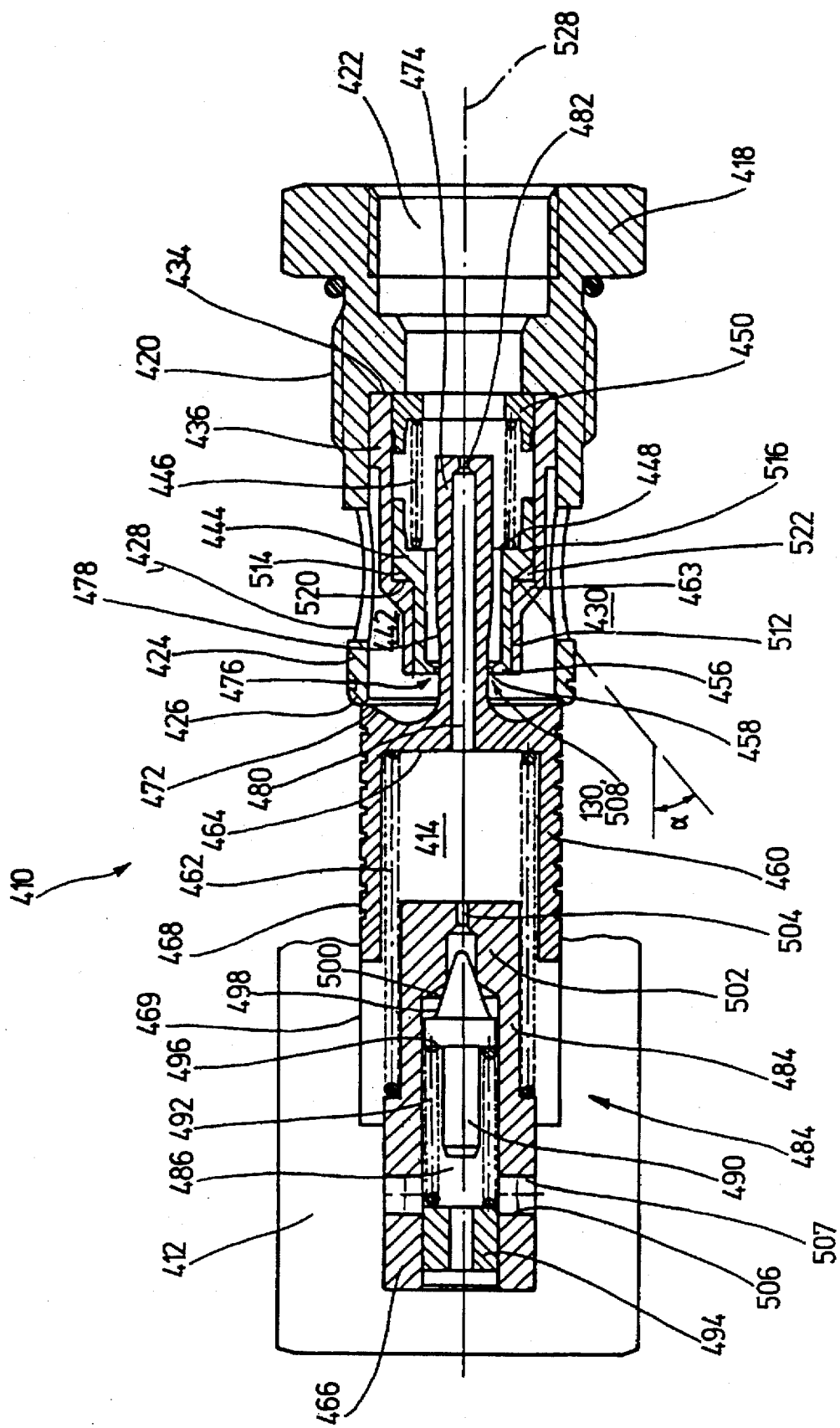
FIG. 11 is a longitudinal cross-sectional view of a further embodiment of a valve assembly according to the present invention.

FIG. 11 shows another embodiment of valve assembly according to the present invention. The valve assembly 410 shown in FIG. 11 includes a housing 412 having an inner space 414. For the sake of clarity, the housing 412 is not shown in its entirety. At one end of the housing 412, the inner space 414 is closed with a plug 418 which is secured in the housing with per se known means, e.g., a thread 420. The plug 418 has an opening 422 connected to an actuator (not shown), e.g., a power steering system. The plug 418 has an axial extension 424 which projects into the inner space 414 and forms a stop 426. The extension 424 has a through-opening 428 which ends in an annular space 430. The through-opening 428 connects the annular space 430 with a hollow space 442 defined by the extension 424. The annular space 430 is connected by a bore (not shown) with a pressure side of a hydraulic delivery apparatus (not shown), e.g. a power assist pump. The extension 424 has a should 434 defining an inner annular space, in which a sleeve 436 is located. A piston 444 is displaceable in the sleeve 436 against a biasing force of spring 446. The spring 446 is supported, on one hand, against an end face 448 of the piston 444 and, on the other hand against a spring support 450. The piston 444 has an opposite end face 456 provided with a through-opening 458. The through-opening 458 connects the hollow space 442 with the through-opening 422.

The piston 444 has a small diameter portion 512 and a large diameter portion 516 separated from the small diameter portion by a shoulder 514. The shoulder 514 forms a stop surface that engages a stop 520 formed by the sleeve 436. The shoulder 514 extends at an angle forming a hollow space 522 between the shoulder 514 and the stop 520. At least one opening 463 connects the hollow space 522 with the hollow space 442 and, thereby, with the annular space 430. The opening 465 extends at an arbitrary selectable angle and to a center axis 528 of the valve assembly 410 and forms a cushioning nozzle. The diameter of the opening 463 is selected as small as possible and lies approximately within the range from about 0.3 mm to about 0.8 mm.

Inside the inner space 414, there is provided a valve spool 460 which is displaceable against a biasing force of a spring 462. The spring 462 is supported, on one hand, against a bottom 464 of the spool 460 and, on the other hand, against an insert 466. The spool 460 has a sealing surface 468 which sealingly engages a wall 469 defining the inner space 414. The spool 460 has an end surface 472 which is biased against the stop 426 of the plug 418. The spool 460 has further an axial extension 474 which projects through the opening 458 of the piston 444 and opens into the opening 422 of the plug 418. The diameter of the extension 474 is smaller than the diameter of the opening 458, whereby an annular gap 476 is formed. The extension 474 has a conical enlargement 478 and an axial bore 480 which is connected with the opening 422 by a restriction orifice 482. Another end of the bore 480 opens into the inner space 414.

The insert 466 closes the inner space 414 at an end thereof remote from the plug 418. The insert 466 is either pressed into the housing 412 or is served therein. The insert 466 is formed as a sleeve 484 having an inner space 486 in which a pressure limiting valve 488 is located. The pressure limiting valve 488 has a closure body 490 displaceable against a biasing force of a spring 492. The spring 492 is supported, on one hand, against a plug 494 and, on the other hand, against a collar 496 of the slide body 490. The spring 492 biases a conical surface 498 of the slide body 490 against an edge 500 of a valve seat 502. The valve seat 502 can be formed as one-piece with the sleeve 484, and it seals the inner space 486 from the inner space 414, simultaneously forming a seat for pressure limiting valve 488. The valve seat 502 has an axial bore 504 which opens into the inner space 414. A bore 506 connects the inner space 486 with an annular space 507 connected by a channel (not shown) with a reservoir or an the inlet side of the hydraulic delivery apparatus.

The valve assembly 410 shown in FIG. 11 functions as follows.

As it has already been discussed previously, the valve assembly 410 serves for delivering a fluid flow to a hydraulic actuator and controlling the delivered flow. The delivered fluid flow should be limited to a predetermined value even in the case when in addition to an increased fluid flow from a motor vehicle engine-driven delivery apparatus, which results from an increase of an engine speed due to the application of a steering force to the steering system, an increase in the system pressure takes place. This, e.g., takes place at a rapid drive on a highway when the delivery apparatus has a high speed and delivers a high volumetric flow.

A fluid flow which is delivered form the delivery apparatus (not shown) through the annular space 430, the opening 428 and the hollow space 442, acts on the spool 460. At the same time, a predetermined fluid flow is delivered through the annular gap 476 into the opening 422 and therefrom to the actuator connected thereto. This fluid flow is determined by a free cross-section of the opening 458 or the free cross-section of the annular gap 476. The annular gap 476 defines a first metering orifice 508.

When the volumetric flow and the resulting pressure difference across the metering orifice 508 increases, the spool 460 is displaced against the biasing force of the spring 462. Because of the axial displacement of the spool 460, the extension 474 is drawn into the opening 458, and the conical enlargement 478 reduces the free cross-section of the opening 458, with an accompanying reduction of the annular gap 476. Thereby it is achieved that a reduced volumetric flow is delivered through the opening 422 to the actuator, despite an increased volumetric flow from the delivery apparatus.

If the high volumetric flow is accompanied by an increased system pressure, the flow force-dependent pressure is likewise increased. This additional pressure increase is established, as discussed, in the hollow space 442. This pressure acts on the spool 460, on one hand, and, on the other hand, on the end face 456 of the piston 444 and, through opening 463 in the hollow space 522, on the shoulder 514 of the piston 444. When this pressure exceeds a predetermined value, the piston 444 is displaced against the biasing force of the spring 446. As a result, the end face 456 is displaced relative to the conical enlargement 478 of the extension 474 which, because of the axial displacement of the spool 460, moves in opposite direction. Because of opposite displacements of the spool 460 and the piston 444, a rapid decrease of the free cross-section of the opening 456, i.e., the annular gap 476 takes place. Thus, with an increase of the flow force, an addition of strokes of the spool 460 and the piston 444 takes place. Thereby, a double stroke adjustment of the metering orifice 508 takes place. By combining the displacements of the spool 460 and the piston 444, which operate independently of each other, an appropriate control of the fluid flow in the opening 422 is achieved even at different high system pressures. Thus, there are provided flow rate characteristics that insure a reduction of the fluid flow to a desired value, e.g. below 8 liter/min, even at high system pressures and a high volumetric flow.

Figure 12:
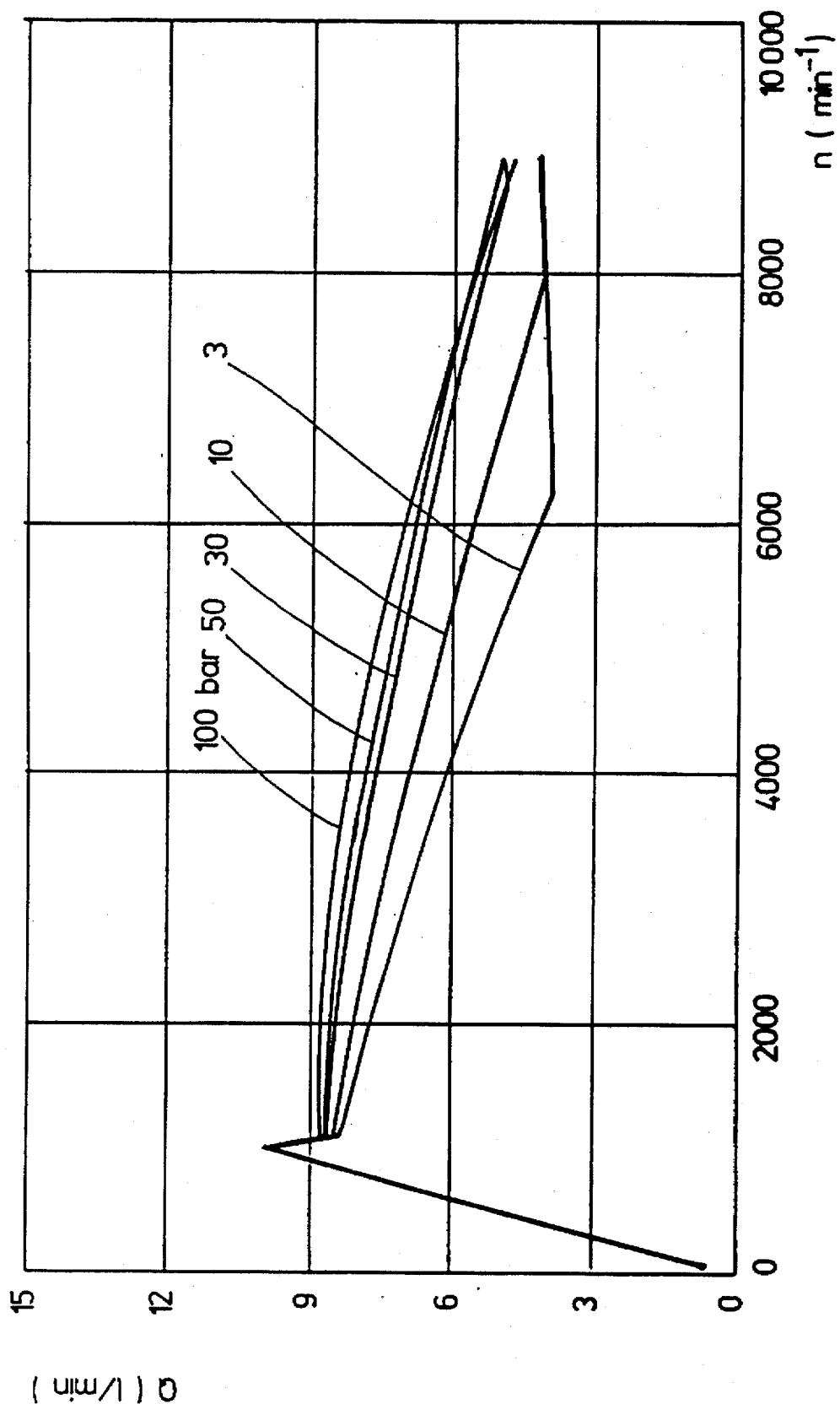
FIG. 12 is a diagram showing a family of flow rate characteristics of the valve assembly shown in FIG. 11.

FIG. 12 shows flow rate characteristics of the valve assembly shown in FIG. 11. The characteristics show the dependence of the volumetric flow Q from the speed n of the delivery apparatus (not shown), e.g., a power assist pump, e.g., a vane pump at different pressures. The diagram shown in FIG. 12 makes it clear that, despite very high speeds n and equally high system pressures, up to 100 bar, a reduction of the volumetric flow to a substantially constant value under 8 liter/min. is possible. The lowering of the characteristics at different pressures is substantially uniform, as can be seen in FIG. 12. That means that the characteristics in the region of high speeds, extend substantially parallel to each other in a volumetric flow range of from about 5 to 8 liter/min.

By appropriately shaping the spool 460 and the piston 444, in particular their end faces, which are subjected to the additional pressures and by appropriate setting of spring forces of the springs 446 and 462, the flow rate characteristics can be established independently of each other at both high and low pressures. The spool 460 provides for a path-dependent control of the metering orifice 508. The piston 444 provides for flow force-dependent control of the flow rate characteristics, in particular at high pressures. The flow force acts on the end fact 456 and the shoulder 514 of the piston 444, when a pressure difference between pressures in the hollow space 442 and the opening 422 increases. The actuating pressure difference is determined by the flow force of the fluid and by the biasing force of the spring 462 acting on the piston 444.

The flow force acts on the piston 444, displacing it against the biasing force of the spring 446.

The above-discussed control of the fluid flow into the opening 422 and, thus, of the fluid flow to the actuator connected therewith, may cause vibrations of the piston 444 and, thereby, an unsteady change of the flow rate characteristics. The hollow space 522 forms a cushioning space for the piston 444, so that the vibrations, that is rapid increases and decreases of the size of the metering orifice 508 is prevented. The opening 463 connects the hollow space 422 with the annular space 430 so that the latter is filled with fluid. If the volumetric flow, because of an increased speed of the delivery apparatus increases, the flow force-dependent pressure acting on the piston 444 likewise increases. This increases results form an increased pressure difference between the pressure in the opening 422 and the hollow space 442 or the hollow space 430. This increase provides for the adjustment of the metering orifice 508, by the displacement of the piston 444, and is transmitted to the hollow space 422. The cushioning characteristics of the hollow space 422 depends on the diameter of the opening (cushioning nozzle 463). By selecting the angle at which the opening 463 extends to the center line 428, the dynamic pressure or the flow force in the hollow space 522 can be influenced. The smaller is the angle, the larger should be the flow force-dependent pressure for adjusting the piston 444. By appropriately shaping the hollow space 522 and by selecting the position of the opening 463, the hollow space 522 can be used as a control space for controlling the throttling position of the piston 444. After mounting of the valve assembly 410, increase of either of the dynamic pressure-dependent flow component or the flow force-dependent flow component causes the adjustment of the piston 444.

During the axial displacement of the piston 444, the shoulder 514 of the piston 444 moves away from the stop 520 of the sleeve 436, and the volume of the hollow space 522 increases. An increased amount of fluid, which flows into the increased volume hollow space 522 through the opening 463, acts on the piston 444. When he system pressure decreases, the pressure difference between the pressures in the annular space 430 or the hollow space 442 and the opening 422 likewise decreases, and the piston 444 is biased axially by the spring 446 toward the spool 460. The fluid, which occupies the hollow space 522 flows through the opening 463 back into the annular space 430 or the inner space 442. The opening 463 forms a restriction, so that increase and decrease of the pressure difference available in the hollow space 522 acts on the shoulder 514 and provides a braking (dampening force) acting in a direction opposite to the direction of a force causing the vibration of the piston 444, whereby resilient cushioning is provided for the piston 444. Thereby, rapid alternating increase and decrease of the operational cross-section of the metering orifice 508, because of vibrations of the piston 444, is prevented.

The pressure established in the opening 422 is transmitted, through the bore 480 of the extension 474 of the spool 460, to the inner space 414 and, thus, to the pressure limiting valve 488. Because of the restriction orifice 482, the pressure action on the pressure limiting valve will be smaller than that in the hollow space 442. When the predetermined maximum pressure in the inner space 414 is exceeded, the pressure applied to the slide body 490 through the opening 504 will displace the slide body 490 against the biasing force of the spring 492, and the fluid will flow through the inner space 486 and the bore 506, e.g., to the inlet side or the reservoir of the delivery apparatus. Thereby, the pressure will be limited to the maximum predetermined value and will not increase further.

Figure 13:
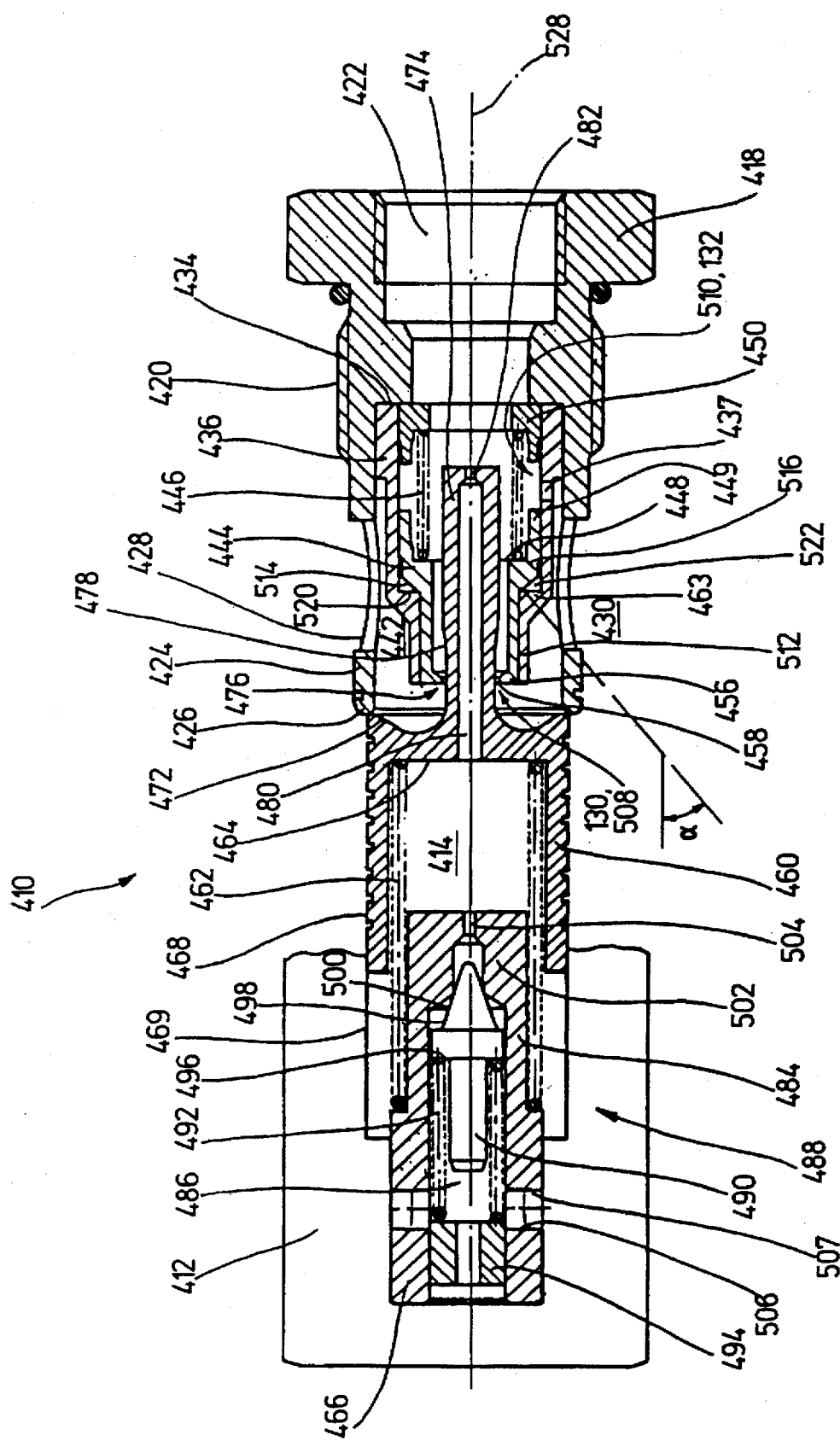
FIG. 13 is a longitudinal cross-section view of still further embodiment of a valve assembly according to the present invention.

FIG. 13 shows a modified embodiment of the valve assembly 410. In FIG. 13, the elements common with those of FIG. 11 are designated with the same reference numerals and would not be discussed further.

In the embodiment shown in FIG. 13, the sleeve 436 has at least one through opening 437 that connects the opening 422 with the hollow space 442. The opening 437 is axially spaced from an annular projection 449 of the piston 444. Thereby, it is achieved that, in addition to the fluid flow through the metering orifice 508, a further fluid flow through the opening 437 is provided, which is combined in the opening 422 with the fluid flow through the meter in orifice 508 to provide a full flow to the actuator. The opening 437 forms a second metering orifice 510 which extends parallel to the metering orifice 508. The metering orifice 510 provides a throttling function independent from that of the metering orifice 508. The additional throttling function is achieved by the displacement of the piston 444 against the biasing force of the spring 446 by the pressure difference of pressures acting in the hollow space 442 and the opening 422, whereby the annular extension 449 of the piston 444 overlaps at least partially the opening 437. By selecting an appropriate axial distance between the annular extension 449 and the opening 437, a dead stroke, i.e., a predetermined pressure rise at which the second metering orifice 510 becomes effective, can be adjusted.

By varying the cross-section of the opening 437 or by providing a plurality of axially spaced openings 437 in the sleeve 436, an appropriate flow rate characteristic can be associated with each cross-section or opening 437 in accordance with expected additional proportional pressure increases. Thus, in addition to a combined path-dependent and flow force-dependent control of the fluid flow through the metering orifice 508, an additional flow force-dependent control of the flow rate characteristics by controlling the fluid flow through the metering orifice 510 is provided. Essential is that the metering orifice 508 is controlled in addition to the displacement of the spool 460, i.e., the extension 474, by the displacement of the piston 444, i.e., a double-stroke adjustment of the metering orifice 508 is provided.

By the combined flow control through the metering openings 508 and 510, it becomes possible to use several parameters for providing a predetermined arbitrary selected flow rate characteristic. Among those parameters are setting of the biasing forces of the springs 462 and 446 as opening forces, the strokes of the spool 460 and the piston 444, and the size of the opening 463, each of which parameters can be separately set. The cross-section of the metering orifices 508 and 510 can be further adjusted by selecting the appropriate diameters of the openings 458 and 437 as well as by selecting the conicity of the enlargement 478. This is possible by the use of the flow forces, which are generated at a high volumetric flow by system pressure differences, for displacing the piston 444.

Figure 14:
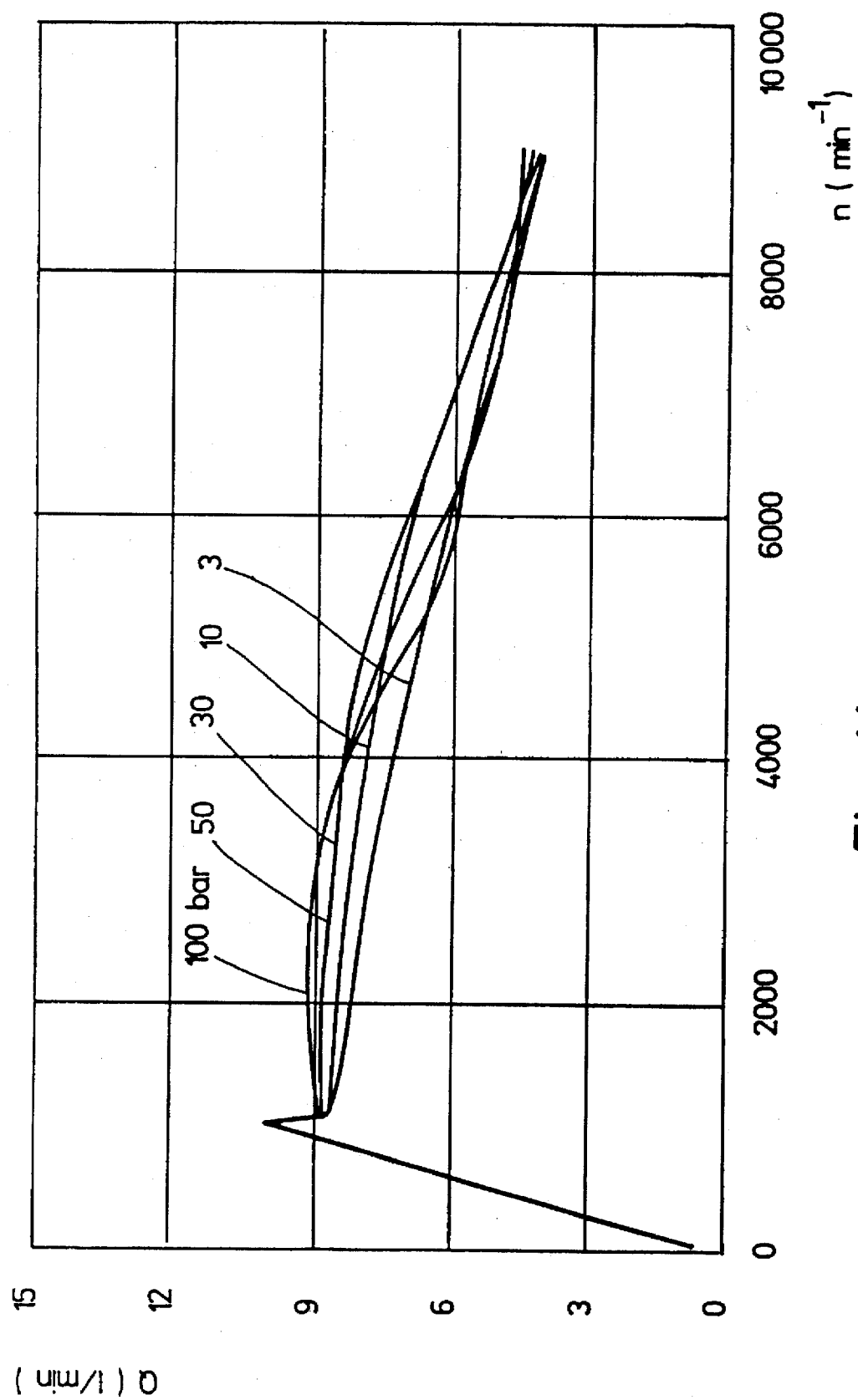
FIG. 14 is a diagram showing a family of flow rate characteristics of the valve assembly shown in FIG. 13.

The combined control of the fluid flow can be further combined with the use of cushioning properties provided by the hollow space 522. The cushioning function of the hollow space 522 was discussed with reference to FIG. 11. FIG. 14 shows flow rate characteristics of the valve assembly shown in FIG. 13. It can be seen from the diagram shown in FIG. 14, that the control region of the flow rate characteristics at high speed n of the delivery apparatus and different system pressures between 5 and 100 bar lies in a very narrow range. It is possible to provide flow rate characteristic that would differ from each other, at the same speed and different high pressures, with regard to the volume, by not more than about 1 liter/min. It is especially clear that, with flow rate characteristics for high pressure, at the increased speed and the increased thereby dynamic pressure, a large reduction of the volumetric flow is possible.

Though the present invention was shown and described with reference to the preferred embodiments, various modification thereof will be apparent to those skilled in the art and, therefore, it is not intended that the invention be limited to the disclosed embodiments and details thereof, and departure may be made therefrom within the spirit and scope of the present invention as defined in the appended claims.

What is claimed is:

1. A valve assembly for controlling fluid flow to an actuator, comprising:

throttle means for controlling flow rate of a fluid delivered to the actuator; and flow control valve means for controlling fluid flow through the throttle means and including a valve spool and a spring for biasing the value spool to a position of a maximum predetermined fluid flow through the throttle means, wherein the throttle means comprises first and second throttles which function independently from each other and are formed each by a variable metering orifice, with both first and second throttles controlling the fluid flow rate, wherein the flow control valve means includes first means for effecting a discharge pressure-dependent control of the first throttle, and second means for effecting a delivery pressure-dependent control of the second throttle independently of the control of the first throttle, wherein the second means comprises means for controlling the second throttle in accordance with a pressure difference between the delivery pressure of a delivery apparatus and a pressure acting on the valve spool for displacing the same against the biasing force of the spring and wherein the variable metering orifice forming the first throttle is formed by an annular gap between an opening, which is formed in an end face of sleeve means, and an axial extension of the valve spool projecting through the opening.

* * * * *